Patented Feb. 15, 1949

2,462,042

UNITED STATES PATENT OFFICE 2,462,042

CONJOINTLY POLYMERIZED UNSATURATED SUBSTANCES

Arthur M. Howald and John Leslie Jones, Toledo, Ohio, assignors to Libbey-Owens-Ford Glass Company, Toledo, Ohio, a corporation of Ohio No Drawing. Application January 12, 1944, Serial No. 517,986

14 Claims. (Cl. 260—45.4)

The invention relates to a composition consisting of a combination of polymerizable substances that co-act to provide important advantages in fabrication and in the properties of hardened articles containing the product of the polymerization of the composition.

A polymerizable unsaturated polyester is highly advantageous as a starting material for the production of hardened synthetic resins in that it is resinous in character before polymerization, and is fusible at a temperature at which polymerization is not rapid. Other heat hardenable compositions, such as urea-formaldehyde and phenol-formaldehyde compositions, are much more difficult to fabricate because they do not exist as plastic resins at temperatures much below their hardening temperatures. A heat hardenable composition can be shaped only while it is in a fused condition, and the failure of other hardenable compositions to reach a fused state below their hardening temperatures is a great handicap in fabricating operations. By the time a hardenable urea-formaldehyde or phenol-formaldehyde product has reached a fused state in a fabricating operation, its hardening already has begun, so that the hardening interferes with the shaping or molding of the composition.

Still other heat hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable polyester is resinous because it is a polymer. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat hardenable polyester, such as glycerol phthalate, is hardened by esterification with elimination of water. A polyester that hardens by esterification cannot be employed to make a molded article or other solid body because it is too difficult to remove water from the interior of such a solid body in order to complete the hardening. Even urea-formaldehyde and phenol-formaldehyde products tend to give off small amounts of volatiles as they are hardened in a mold. A polymerizable unsaturated polyester hardens by polymerization without evolution of volatiles.

A product obtained by the hardening of a composition in which an unsaturated polyester is the only polymerizable component is lacking in water resistance and hardness. In some cases by dissolving a liquid monomeric polymerizable composition in an unsaturated polyester and then polymerizing, it is possible to obtain a product of improved water resistance and hardness.

The principal object of the invention is to provide a novel combination of a polymerizable unsaturated polyester and another polymerizable substance that produces important improvements in the production of hardened products. More specific objects and advantages are apparent from the description which merely discloses and illustrates the invention and is not intended to impose limitations upon the claims.

A hardenable composition embodying the invention comprises a polymerizable unsaturated polyester and a complex monomeric carbon compound having at least two polymerizable double bonds, at least one of which is contained in a beta-gamma-olefinic alcohol radical. Such a carbon compound contains at least one ester linkage for each beta-gamma-olefinic alcohol radical plus at least one additional ester linkage. Because of the complex molecular structure of such a compound, the polymerization of a composition comprising such a compound and a polymerizable unsaturated polyester produces a product that contains extremely large and complex molecules and usually has great inertness, hardness and water resistance. Such compounds have very high boiling points and some of them are nondistillable, so that a composition embodying the invention can be hardened at elevated temperatures for various periods and under various conditions with little or no loss of the compound by volatilization, even though no special precautions are taken to prevent such loss.

The preferred type of monomeric polymerizable carbon compound for use in a hardenable composition embodying the invention is a derivative of an ester of a beta-gamma-olefinic alcohol with a monobasic hydroxy-substituted acid. In such a compound of the preferred type, a beta-gammaolefinic alcohol radical is connected by an ester linkage to the acid radical of a hydroxy-substituted monobasic acid that in turn has its hydroxy group esterified to form a connection with the remainder of the molecule. The present invention is extremely versatile in that the monomeric polymerizable compounds may have molecules of widely different types. The wide variation that is possible in the molecular structures of the monomeric polymerizable carbon compounds makes it possible to use compounds that are compatible with all kinds of polymerizable unsaturated polyesters, and which when polymerized together with the various unsaturated polyesters produce hardened products having widely varied properties fitting them for many different uses.

The carbon compound in a hardenable composition embodying the invention may consist of an ester of two substances that will be described, one of which has a carboxy group and the other of which has an alcoholic hydroxy group. The substance having a carboxy group has the general formula R—O—D—OH, in which R is allyl, crotyl, alpha-methyl allyl, methallyl, beta-chloro allyl or beta-methyl crotyl and D is the divalent acid radical of any of the dibasic acids listed in Table I.

TABLE I $$HO-\overset{O}{\overset{\|}{C}}-OH$$
$$HO-\overset{O}{\overset{\|}{C}}-OH$$
Maleic acid $$Cl-\overset{O}{\overset{\|}{C}}-OH$$
$$H\overset{O}{\overset{\|}{C}}-OH$$
Chloromaleic acid $$Br-\overset{O}{\overset{\|}{C}}-OH$$
$$H\overset{O}{\overset{\|}{C}}-OH$$
Bromomaleic acid $$HO-\overset{O}{\overset{\|}{C}}-OH$$
$$H\overset{O}{\overset{\|}{C}}-OH$$
Fumaric acid $$HO-\overset{O}{\overset{\|}{C}}-C-Cl$$
$$H\overset{O}{\overset{\|}{C}}-OH$$
Chlorofumaric acid $$HO-\overset{O}{\overset{\|}{C}}-C-Br$$
$$H\overset{O}{\overset{\|}{C}}-OH$$
Bromofumaric acid $$HO-\overset{O}{\overset{\|}{C}}-C-CH_3$$
$$H\overset{O}{\overset{\|}{C}}-OH$$
Mesaconic acid $$CH_3-\overset{O}{\overset{\|}{C}}-\overset{O}{\overset{\|}{C}}-OH$$
$$H\overset{O}{\overset{\|}{C}}-OH$$
Citraconic acid $$HO-\overset{O}{\overset{\|}{C}}-\overset{CH_3}{\overset{|}{C}}-CH_2-\overset{O}{\overset{\|}{C}}-OH$$
Itaconic acid $$HO-\overset{O}{\overset{\|}{C}}-OH$$
Carbonic acid $$HO-\overset{O}{\overset{\|}{C}}-\overset{O}{\overset{\|}{C}}-OH$$
Oxalic acid $$HO-\overset{O}{\overset{\|}{C}}-CH_2-\overset{O}{\overset{\|}{C}}-OH$$
Malonic acid $$HO-\overset{O}{\overset{\|}{C}}-(CH_2)_2-\overset{O}{\overset{\|}{C}}-OH$$
Succinic acid $$HO-\overset{O}{\overset{\|}{C}}-(CH_2)_3-\overset{O}{\overset{\|}{C}}-OH$$
Glutaric acid $$HO-\overset{O}{\overset{\|}{C}}-(CH_2)_4-\overset{O}{\overset{\|}{C}}-OH$$
Adipic acid $$HO-\overset{O}{\overset{\|}{C}}-(CH_2)_5-\overset{O}{\overset{\|}{C}}-OH$$
Pimelic acid $$HO-\overset{O}{\overset{\|}{C}}-(CH_2)_6-\overset{O}{\overset{\|}{C}}-OH$$
Suberic acid $$HO-\overset{O}{\overset{\|}{C}}-(CH_2)_7-\overset{O}{\overset{\|}{C}}-OH$$
Azelaic acid $$HO-\overset{O}{\overset{\|}{C}}-(CH_2)_8-\overset{O}{\overset{\|}{C}}-OH$$
Sebacic acid $$HO-\overset{O}{\overset{\|}{C}}-\!\!\left(\bigcirc\right)\!\!-\overset{O}{\overset{\|}{C}}-OH$$
Benzene dicarboxylic acid $$HO-\overset{O}{\overset{\|}{C}}-\!\!\left(\bigcirc\!\!-\!\!\bigcirc\right)\!\!-\overset{O}{\overset{\|}{C}}-OH$$
Biphenyl dicarboxylic acid $$HO-\overset{O}{\overset{\|}{C}}-\!\!\left(\bigcirc\!\bigcirc\right)\!\!-\overset{O}{\overset{\|}{C}}-OH$$
Naphthalene dicarboxylic acid $$HO-\overset{O}{\overset{\|}{C}}-(C_6H_{10})-\overset{O}{\overset{\|}{C}}-OH$$
Cyclohexane dicarboxylic acid $$HO-\overset{O}{\overset{\|}{C}}-\overset{CH_3}{\overset{|}{C}H}-CH_2-\overset{O}{\overset{\|}{C}}-OH$$
Pyrotartaric acid "Benzene dicarboxylic acid" in the foregoing table includes o-, m-, and p-phthalic acid. Similarly, the enclosure of the biphenyl ring and the naphthalene ring in parentheses in the above table is intended to indicate that any of the various position isomers may be used. In the case of cyclohexane dicarboxylic acid, any of the various position isomers may be used either in cis or in trans relationship.

The substance having an alcoholic hydroxy group may consist of a compound having the general formula

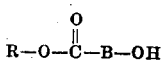

in which R is the monovalent hydrocarbon radical or monovalent chlorinated hydrocarbon radical of any of the alcohols listed in Table II below, and in which B is methylene, methyl methylene, or any phenylene radical.

TABLE II $CH_2=CH-CH_2-OH$
Allyl alcohol $CH_3-CH=CH-CH_2-OH$
Crotyl alcohol $$CH_2=CH-\underset{\underset{CH_3}{|}}{CH}-OH$$
Alpha-methyl allyl alcohol $$CH_2=\underset{\underset{CH_3}{|}}{C}-CH_2-OH$$
Methallyl alcohol $$CH_2=\underset{\underset{Cl}{|}}{C}-CH_2-OH$$
Beta-chloro allyl alcohol $$CH_3-CH=\underset{\underset{CH_3}{|}}{C}-CH_2-OH$$
Beta-methyl crotyl alcohol Such a monomeric polymerizable carbon compound thus has the general formula

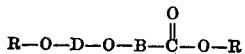

The polymerizable monomeric carbon compound in a hardenable composition embodying the invention may also consist of an ester of a molecule of silicic acid with four molecules of an ester of glycolic or lactic acid with any of the alcohols listed in Table II. Such a polymerizable monomeric carbon compound has the general formula

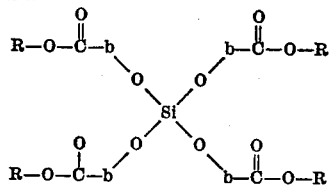

in which b is methylene or methyl methylene and R has the same significance as before.

The polymerizable monomeric carbon compound in a hardenable composition embodying the invention may also consist of an ester of a molecule of any of the dibasic acids listed in Table I with two similar molecules (or a mixed ester of a molecule of such a dibasic acid with two dissimilar molecules) each of which is an ester of glycolic, lactic or o-, m- or p-hydroxy benzoic acid with any of the alcohols listed in Table II. Such a polymerizable monomeric carbon compound has the general formula

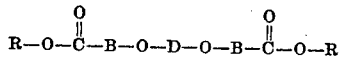

PREPARATION OF POLYMERIZABLE MONOMERIC CARBON COMPOUND

The first step in the preparation of many of the monomeric compounds may consist in preparing an ester of an alcohol listed in Table II with a monobasic hydroxy-substituted, chloro-substituted or bromo-substituted acid, such as glycolic acid, chloracetic acid, lactic acid, alpha-bromo propionic acid or hydroxy benzoic acid. Such an ester is easily prepared by the methods customarily used for preparing esters. An excess of the alcohol may be reacted with the acid in the presence of an acid catalyst to produce an ester, the water produced by the reaction and the excess of alcohol being removed. The ester often can be separated from the excess of the alcohol by fractional distillation. In some cases it may be desirable to use an ester interchange reaction. For example, since methallyl alcohol is unstable under acid conditions, it is desirable first to prepare a simple ester such as the methyl ester of the acid to be used, and then to prepare the desired methallyl ester by reacting the methyl ester with methallyl alcohol, in the presence of a small amount of sodium as the catalyst, while distilling off the liberated methyl alcohol.

After the preparation of such an ester, a compound having the general formula

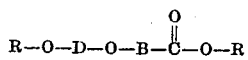

is prepared by reacting one molecule of the ester with one molecule of a derivative of a half ester of one of the dibasic acids listed in Table I with one of the alcohols listed in Table II.

If an ester of a hydroxy-substituted acid with an alcohol listed in Table II has been prepared, one molecule thereof may be reacted with one molecule of the acid-chloride of a half ester listed above (with elimination of hydrogen chloride), or in some cases with one molecule of the half ester itself (with elimination of water).

If an ester of a chloro- or bromo-substituted acid with an alcohol listed in Table II has been prepared, one molecule thereof may be reacted with one molecule of the monopotassium or monosodium salt of a half ester listed above, the chloride or bromide of potassium or sodium being formed as a byproduct of the reaction.

A compound having the general formula

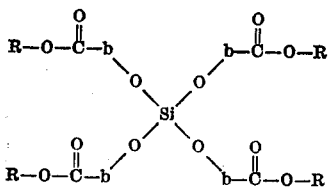

may be prepared by reacting one molecule of silicon tetrachloride with four molecules of the ester of glycolic or lactic acid with one of the alcohols listed in Table II.

A compound having the general formula

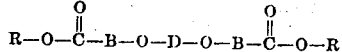

may be prepared by reacting two molecules of the ester of glycolic acid, lactic acid, a corresponding chloro- or bromo-substituted acid, or a hydroxy benzoic acid with an alchohol listed in Table II, and one molecule of a derivative of one of the dibasic acids listed in Table I. If an ester of a hydroxy-substituted acid with an alcohol listed in Table II has been prepared, two molecules thereof may be reacted with one molecule of the acid dichloride of the dibasic acid (with elimination of hydrogen chloride) or with the anhydride of the dibasic acid, if one exists, or in some cases with the dibasic acid itself (with elimination of water). If an ester of a chloro- or bromo-substituted acid with an alcohol listed in Table II has been prepared, two molecules thereof may be reacted with one molecule of the dipotassium or disodium salt of the dibasic acid, the chloride or bromide of potassium or sodium being formed as a byproduct of the reaction.

A compound having the same general formula which is a mixed ester may be prepared by using a mixture of two different esters of hydroxy-substituted, chloro-substituted or bromo-substituted acids for the reaction with the derivative of a dibasic acid, or by reacting one molecule of an ester of a hydroxy-substituted, chloro-substituted or bromo-substituted acid with one molecule of a derivative of a dibasic acid and then reacting the product with one molecule of a different ester of a hydroxy-substituted, chloro-substituted or bromo-substituted acid.

Example 1

After the addition of 7.5 grams of sulfuric acid to 1500 grams of a 50 per cent aqueous solution of lactic acid, distillation is carried out first at atmospheric pressure and then under vacuum until no further water can be removed. To the residue of about 570 grams, consisting essentially of polylactic acid, is added 2400 grams of allyl alcohol. After 12 hours of refluxing, the excess of allyl alcohol is distilled off at atmospheric pressure and refractionated in a packed column to recover the allyl lactate carried over in the alcohol vapor. The crude ester is distilled and then redistilled to produce a 70 per cent yield of allyl lactate. This yield can be increased by recovering and reusing the unreacted polylactic acid remaining in the esterification vessel. A mixture of 65 grams (one-half mol) of allyl lactate, 24.5 grams (one-fourth mol) of maleic anhydride, 1 gram of p-toluene sulfonic acid and 100 cc. of toluene is refluxed for 12 hours with a Dean-Stark moisture trap connected to the condenser for collection of the water phase. After 12 hours the water phase consists of 4 cc. The resulting toluene solution is washed three times with water and dried over calcium sulfate and the toluene is then distilled off under reduced pressure. A satisfactory yield of maleyl bis-(allyl lactate) in the form of a pale straw colored liquid is obtained. The value of $N_D^{25}$ is 1.463 and of $d_4^{25}$ is 1.130 for this product. A lighter colored product can be obtained by the use of a carbon dioxide atmosphere during refluxing, and by the use of hydrogen chloride gas instead of p-toluene sulfonic acid as the catalyst. However, any reasonably strong acid serves as a catalyst, and the solvent may be any one that dissolves the reactants and yet remains immiscible with the water layer. The use of a solvent having a lower boiling point would cause the reaction to take longer.

Example 2

A mixture of 2 mols of fumaric acid and 5 mols of thionyl chloride is refluxed for 40 hours and the excess of thionyl chloride is removed by distillation of the product through a small packed column to give an 89 per cent yield of fumaryl dichloride having a boiling point of 159–160° C. at atmospheric pressure. To 260 grams (2 mols) of allyl lactate is added 153 grams (1 mol) of fumaryl dichloride, one drop at a time over a period of 2 hours in an atmosphere of carbon dioxide and at a temperature of 85° to 95° C. After 4 hours at this temperature the product has a constant weight of about 340 grams and consists of a quantitative yield of fumaryl bis-(allyl lactate) in the form of a pale straw colored liquid. A pale straw color is characteristic of products obtained from colored acid chlorides such as fumaryl dichloride. The product is washed with water twice and then once with a dilute aqueous sodium hydroxide solution and then twice more with water, and is finally dried over anhydrous calcium sulfate. The product has a refractive index measured at 25° C. by means of the sodium D line ($N_D^{25}$) of 1.468 and a specific gravity at 25° C. compared with water at 4° C. ($d_4^{25}$) of 1.138.

Example 3

After being mixed at room temperature, 168 grams (1.3 mols) of allyl lactate and 100 grams (.65 mol) of succinyl dichloride are warmed gently to initiate the exothermic reaction. After the reaction starts, the reactants are cooled at first, and reaction is continued for 3 hours. The crude product is heated in a vacuum on a water bath to remove hydrogen chloride, and then diluted with ether, washed twice with water, then once with a dilute aqueous sodium hydroxide solution, and then twice more with water. After drying with anhydrous sodium sulfate the ether is distilled off. A 95 per cent yield of succinyl bis-(allyl lactate) is obtained in the form of a colorless liquid ($N_D^{25}=1.453$; $d_4^{25}=1.131$). Succinyl bis-(allyl lactate) can be prepared by a second procedure, similar to that described in Example 1, consisting in reacting allyl lactate with succinic anhydride in toluene solution in the presence of hydrogen chloride and in a carbon dioxide atmosphere.

Example 4

Adipyl bis-(allyl lactate) is prepared by a procedure that is the same as the first procedure for the preparation of succinyl bis-(allyl lactate) described in Example 3, except that instead of the succinyl dichloride an equivalent amount of adipyl dichloride is employed. A yield of about 90 per cent of adipyl bis-(allyl lactate) is obtained in the form of a colorless liquid $$(N_D^{25}=1.455; d_4^{25}=1.105).$$

Example 5

Sebacyl bis-(allyl lactate) is prepared by a procedure that is the same as the first procedure for the preparation of succinyl bis-(allyl lactate) described in Example 3, except that instead of succinyl dichloride an equivalent amount of sebacyl dichloride is employed. A quantitative yield of sebacyl bis-(allyl lactate) is obtained in the form of a colorless liquid ($N_D^{25}=1.455$; $d_4^{25}=1.052$).

Example 6

Phthalyl bis-(allyl lactate) is prepared by a procedure that is the same as the first procedure for the preparation of succinyl bis-(allyl lactate) described in Example 3, except that instead of succinyl dichloride an equivalent amount of redistilled commercial phthalyl dichloride is employed, heating being continued on a water bath at 80–90° C. for 5 hours. A yield of about 70 per cent of phthalyl bis-(allyl lactate) is obtained in the form of a pale straw colored viscous liquid $$(N_D^{25}=1.495; d_4^{25}=1.165).$$

A higher yield can be secured by heating for a longer time or at a higher temperature. Phthalyl bis-(allyl lactate) can be prepared by a second procedure similar to that described in Example 1, consisting in reacting allyl lactate with phthalic anhydride in toluene solution in the presence of hydrogen chloride and in a carbon dioxide atmosphere.

Example 7

After the addition of 249 grams of pyridine to a solution of 390 grams of allyl lactate in 600 cc. of benzene, phosgene is passed at about 50–60° C. until the gain in weight of the solution is about 145 grams. The pyridine hydrochloride is filtered off and washed with benzene, and the benzene solution is allowed to stand an hour for further reaction. The benzene solution is then washed twice with water, once with a 4 per cent aqueous sodium hydroxide solution and then twice more with water to produce a neutral solution After the solution has been dried over-night with anhydrous calcium sulfate, the benzene is distilled off in vacuum and the carbonyl bis-(allyl lactate) is then distilled to produce a 95 per cent yield of the distilled product having a boiling point of 165° C. at 5 mm. ($N_D^{25}=1.446$; $d_4^{25}=1.123$).

Example 8

A mixture of 46.4 grams of allyl glycolate and 30.6 grams of fumaryl dichloride is heated on a water bath at 85–95° C. for 2½ hours in a carbon dioxide atmosphere. The resulting oil crystallizes upon standing over-night. By recrystallization from ethanol a substantially quantitative yield of fumaryl bis-(allyl glycolate) melting at 71–72° C. can be obtained.

Example 9

After 69.6 grams of allyl glycolate, 47.4 grams of pyridine and 100 cc. of dry benzene have been heated to refluxing, 28 grams of phosgene is passed into the boiling solution. Pyridine hydrochloride precipitates and the preparation is completed as in Example 8. A yield of about 95 per cent of carbonyl bis-(allyl glycolate) is obtained ($N_D^{25}=1.452$; $d_4^{25}=1.188$). This product is a water white slightly viscous liquid having a boiling point of about 165° C. at 6 mm.

Example 10

Carbonyl bis-(allyl salicylate) is prepared by a procedure that is the same as the procedure for the preparation of carbonyl bis-(allyl lactate) described in Example 7, except that the ingredients used are 17.8 grams of allyl salicylate, 8 grams of pyridine, 20 cc. of benzene, and 5 grams of phosgene. The crude oily product crystallizes on cooling, and the final product is a substantially quantitative yield of a crystalline white solid melting at 40° C.

Example 11

Silicon tetrachloride (85 grams) is added drop by drop with stirring to allyl glycolate (230 grams) at room temperature. Hydrogen chloride gas forms rapidly and is collected by a gas trap connected to a reflux condenser on the reaction vessel. After all the silicon tetrachloride has been added and the reaction has substantially ceased, the product is heated on a boiling water bath to complete the reaction, a small stream of carbon dioxide being passed through the liquid. Finally the product is heated to 170° C. on an oil bath under a vacuum that reaches about 1 mm. at the end of the heating stage. During the latter part of the heating stage, a small amount of unreacted allyl glycolate distills off. The amount of unreacted allyl glycolate corresponds to an amount of silicon tetrachloride that is lost during the initial evolution of hydrogen chloride. About 21 grams of allyl glycolate can be recovered and the yield of tetra-(allyl glycolate) silicate is 208 grams or 81 per cent. The product is a pale straw colored, somewhat viscous liquid, which hydrolyzes upon exposure to moist air, but does not polymerize at room temperature in the absence of a catalyst. If allyl lactate is substituted for allyl glycolate, a similar procedure can be used to prepare tetra-(allyl lactate) silicate. Both of these compounds are practically non-distillable, having vapor pressures of less than 1 mm. at 170° C.

PREPARATION OF POLYMERIZABLE POLYESTER

A polymerizable unsaturated polyester is prepared by reaction of a polyhydric alcohol with a polybasic acid. It is preferable to employ a dihydric alcohol and a dibasic acid in order to produce a product in which there is maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule; for example, there may be an average of eleven or more double bonds in every ten molecules of the polyester.

The polymerizable unsaturated polyester may be produced by reaction of any desired combination of polybasic acid and polyhydric alcohol. For example, an unsaturated dibasic acid such as maleic, fumaric, itaconic, citaroconic or mesaconic acid may be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Instead of a single polybasic acid, a mixture of polybasic acids may be employed, such as a mixture of an unsaturated dibasic acid with a polybasic acid containing more than two acid radicals, such as citric acid. A mixture of polyhydric alcohols may be employed, such as a mixture of a dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used by readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

The presence of an inhibitor may be desirable to cause the polyester to remain stable during storage or shipment. Any desired anti-oxidant such as hydroquinone, pyrogallol, tannic acid or any aromatic amine, such as aniline or phenylene diamine may be employed as an inhibitor. Although an inhibitor when present in the polyester stabilize the polyester during storage, the polyester may be cured without difficulty upon addition of a curing catalyst.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

End groups in the molecules of the polymerizable polyester may be chemically fixed before polymerization to improve the water resistance attainable upon polymerization, by reacting the end groups in the polyester molecules with any desired fixing agent.

In order to facilitate the chemical fixing of the end groups in the molecules of the polyester, an excess of a polybasic acid may be employed in the preparation of the polyester so as to produce a polyester whose end groups are predominantly acid radicals. Acid radicals in the molecules of the resulting polyester may be reacted with a base formed from a metal of group 2 of the periodic system, such as the oxide, or in alkoxide such as the ethoxide, or the hydroxide of calcium, barium, strontium, beryllium, magnesium, zinc, cadmium or mercury. Alternatively, acid radicals in the molecules of the resulting polyester may be reacted in the presence of an acid catalyst with any monohydric alcohol, such as primary or secondary butanol, primary or secondary pentanol or n-propanol. Alcohols boiling in the range from 97° C. to 160° C. are preferred because they are highly compatible with the polyester and because reaction of acid radicals in the polyester molecules with such an alcohol may be carried out above or substantially at the boiling point of water so as to eliminate the water formed by the reaction without inconveniently rapid loss of the alcohol. Acid radicals in the molecules of the polyester may also be reacted with any aliphatic amine or diamine, such as butylamine, or any aromatic amine or diamine, such as aniline or phenylenediamine.

If end groups in the polyester molecules are to be chemically fixed, it is also permissible to employ an excess of a polyhydric alcohol in the preparation of the polyester so as to produce a polyester whose end groups are predominantly alcohol radicals. Alcohol radicals in the molecules of the resulting polyester may be reacted with any acid chloride, such as phosgene, acetyl chloride, chloroacetyl chloride, succinyl chloride, benzoyl chloride, or silicon tetrachloride. The chloride of any aliphatic or aromatic carboxylic acid may be employed, and the reaction with the alcohol radicals proceeds very readily upon the addition of the acid chloride. Alcohol radicals in the molecules of the polyester may be reacted also with any aliphatic diisocyanate, such as tetramethylene diisocyanate or octamethylene diisocyanate or any organic isocyanate or diisocyanate, such as phenyl isocyanate. Such an isocyanate or diisocyanate readily reacts with alcohol radicals in the polyester molecules and may also react with acid radicals in the molecules.

In any case the proportion of the fixing agent employed is simply a proportion sufficient to fix a substantial number of end groups in the polyester molecules so as to produce an appreciable improvement in the water resistance attainable upon polymerization. When end groups in the polyester molecules are to be fixed, the use of a polyester whose end groups are predominantly of one kind has the advantage that the end groups may be fixed by means of one fixing agent. If the end groups of the polyester include both a substantial proportion of acid radicals and a substantial proportion of alcohol radicals, it may be necessary to react the polyester with two successive agents, one of which fixes the acid radicals and the other of which fixes the alcohol radicals.

Example 12

5.4 mols of maleic anhydride and 5.4 mols of diethylene glycol are mixed together in a three-necked flask. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Example 13

The procedure of Example 12 is employed except that 6 instead of 5.4 mols of maleic anhydride are employed; the diethylene glycol is replaced by 6 mols of ethylene glycol; a slower stream of carbon dioxide is used; and the ingredients are kept on an oil bath at 220° C. for 5½ hours. The resulting polyester is a very thick gum having an acid number of 53.

Example 14

The procedure of Example 13 is employed except that the maleic anhydride is replaced by 5 mols of fumaric acid; the ethylene glycol is replaced by 5 mols of diethylene glycol; and reaction is continued for 8¼ hours. The resulting polyester is a stiff liquid having an acid number of 23. If in the forgoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

Example 15

The procedure of Example 12 is employed except that 1.5 instead of 5.4 mols of maleic anhydride and 1.5 instead of 5.4 mols of diethylene glycol are used together with an amount of hydroquinine equal to 0.2 per cent of the weight of the reacting ingredients; and reaction is continued for 6¼ hours. The resulting polyester is a moderately stiff liquid having an acid number of 11.

Example 16

The procedure of Example 12 is employed except that the maleic anhydride is replaced by 1.5 mols of fumaric acid; 1.5 instead of 5.4 mols of diethyleneglycol are employed; and the temperature is varied between 200 and 220° C. After the reaction has been continued for 2½ hours, the acid number is 73. After 6 hours, the product is a stiff liquid having an acid number of 41.

Example 17

The procedure of Example 16 is employed except that p-toluene sulfonic acid (1.5 grams) is added to the initial ingredients; and reaction for only 2½ hours instead of 6 hours is required to produce a stiff liquid having an acid number of 41.

Example 18

The procedure of Example 16 is employed except that the fumaric acid is replaced by 3.3 mols of maleic anhydride; 3.0 instead of 1.5 mols of diethylene glycol are used; 1.5 grams of p-toluene sulfonic acid and 1.3 grams of hydroquinone are added to the initial ingredients; and the reaction is carried out for 3 hours to produce a limpid liquid having an acid number of 26.

Example 19

The procedure of Example 18 is employed except that the hydroquinone is omitted; and reaction for 5 hours is required to produce a stiff liquid having an acid number of 28.

Example 20

The procedure of Example 17 is employed except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

Example 21

The procedure of Example 12 is employed except that 2 instead of 5.4 mols of maleic anhydride and 2.1 instead of 5.4 mols of diethylene glycol are used; and the reaction is carried out for 4½ hours to produce a stiff liquid having an acid number of 14.

Example 22

The procedure of Example 12 is employed except that 3 instead of 5.4 mols of maleic anhydride and 3.3 instead of 5.4 mols of diethylene glycol are used together with an amount of hydroquinone equal to .09 per cent of the weight of the reacting ingredients and an amount of p-toluene sulfonic acid equal to 0.18 per cent of the weight of the reacting ingredients; and the reaction is carried out for 4 hours at 200° C. to produce a stiff liquid having an acid number of 10.6.

Example 23

The procedure of Example 20 is employed except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a liquid, slightly more viscous than that obtained in Example 22, which has an acid number of 10.1.

PRODUCTION OF HARDENED PRODUCT

A hardened product embodying the invention is the product of the polymerization of a composition comprising one or more polymerizable unsaturated polyesters and one or more of the polymerizable monomeric compounds hereinbefore described. In the production of such a hardened product either the unsaturated polyester or the polymerizable monomeric compound, or both, may be partially polymerized before the two ingredients are mixed, although the polymerization of neither of the two ingredients should be completed before they are mixed.

The preferred type of composition embodying the invention for polymerization to produce a hardened product is a composition comprising a polymerizable unsaturated polyester and an ester of two unsubstituted beta-gamma-olefinic alcohol molecules, each having from three to four carbon atoms, with an ester of not more than two saturated alpha-hydroxy monocarboxylic acid molecules each having from two to three carbon atoms and a molecule of an unsubstituted dibasic acid having from one to five carbon atoms and having not more than a single olefinic unsaturation, in which there are not more than two connecting carbon atoms separating carboxy groups and not more than one carboxy group is attached to a single carbon atom; i. e., which is an ester to two alcohol molecules (each of which is a molecule of allyl, methallyl, alpha-methyl allyl or crotyl alcohol) with another molecule which is an ester of one or two molecules of lactic or glycolic acid with a molecule of carbonic, oxalic, succinic, pyrotartaric, maleic, fumaric, mesaconic, citraconic or itaconic acid. The preferred polymerizable monomeric compounds of this type are carbonyl bis-(allyl lactate) or carbonyl bis-(allyl glycolate), and the corresponding oxalyl, succinyl, maleyl and fumaryl derivatives. Another preferred type of compound is a compound that is an ester of two such alcohol molecules with another molecule that is an ester of one or two molecules of lactic or glycolic acid with a molecule of phthalic acid.

Although polymerizable monomeric compounds of the type hereinbefore described are in general highly compatible with polymerizable unsaturated polyesters, the ingredients used and their proportions should be such that they form homogeneous compositions, such as a solution or colloidal suspension. In some cases the production of a homogeneous composition may be accomplished by addition of a common solvent such as an alcoholic solvent or an ester solvent. A solution so prepared, or preferably a liquid composition containing no unpolymerizable solvent, may be used, after the addition of any desired modifiers, as a binder in the production of impregnated or laminated products, as an adhesive, as a dressing or crease-proofing agent for textiles, or as an ingredient for enamels or other coating compositions, or may be converted to a form and then hardened to produce a porous product suitable for use as an insulating material.

There may be dissolved, in a hardenable composition embodying the invention, any thermoplastic material that is compatible therewith. The hardenable composition then serves as a polymerizable plasticizer. In such a composition the proportions may be varied widely, from a very small proportion of the thermoplastic material to a very preponderant proportion of the thermoplastic material. The incorporation of any small proportion of a hardenable composition embodying the invention in a thermoplastic material, followed by polymerization, may cause a substantial improvement in the properties of the thermoplastic material. Similarly, when a composition embodying the invention contains one or more additional polymerizable substances, such as simple diallyl esters, the proportions of the polymerizable substances may be varied widely. In any case, however, the polymerizable substances in a composition embodying the invention should include a substantial proportion of a polymerizable unsaturated polyester and a substantial proportion of one or more of the polymerizable monomeric compounds hereinbefore described.

Hardening or polymerization of a composition embodying the invention may be carried out by exposing to the air, but the polymerization is accelerated by the use of a catalyst, particularly at room temperatures or moderately elevated temperatures. Any organic peroxide, such as benzoyl peroxide, succinyl peroxide, acetyl peroxide, peracetic acid, perbenzoic acid, toluyl peroxide, p-brombenzoyl peroxide, anisoyl peroxide, chloracetyl peroxide or furoyl peroxide or any organic ozonide, such as diisopropylene ozonide or diisobutylene ozonide, or a mixture of such substances, may be used as the curing catalyst. The amount of catalyst used is simply that amount which causes the hardening or polymerization to take place at the desired rate.

A composition embodying the invention is particularly advantageous for the production of castings, because a compound of the type described, when added to a polymerizable polyester, ordinarily forms a solution whose viscosity is less than that of the polyester. The reduction in the viscosity by addition of such compound assists in the elimination of bubbles when the solution is poured into a mold to produce a casting. Often it is convenient to dissolve the catalyst in such compound and then to add to the polyester the solution of the catalyst in the compound. The advantages of a composition embodying the invention in the production of castings arise not only from the relatively low viscosity of the composition, but also from the extremely high boiling point of the compound, which obviates the formation of bubbles during hardening of the casting at elevated temperatures. A composition embodying the invention also is highly advantageous for the molding of articles under pressure. Since the composition is fusible and plastic at relatively low temperatures, it is possible to adjust the amounts of catalyst and inhibiting agent so that hardening at such temperatures takes place at a reasonable rate to allow ample opportunity for shaping and molding the composition. Shaping and molding may be completed at such a temperature, and the shaped composition may then be held at the same temperature while slow hardening takes place, or may be heated to a higher temperature to cause quick hardening. These properties are in contrast to those of urea-formaldehyde, melamine-formaldehyde and phenol-formaldehyde products, which are plastic only at elevated temperatures at which they harden so rapidly that hardening interferes with shaping.

A further advantage of a composition embodying the invention is that in the presence of a catalyst it hardens very rapidly at a temperature far below its decomposition temperature, at which discoloration does not take place. Other heat hardenable products, such as urea, melamine or phenol-formaldehyde products, must be heated much closer to their decomposition temperatures in order to cause hardening to take place even at moderate speed. When an attempt is made to harden such other products rapidly by raising the hardening temperature, decomposition or "burning" is likely to result.

Because of these properties, a composition embodying the invention can be fabricated in an injection molding machine. A supply of the composition may be held in the supply cylinder of the machine at a temperature at which the composition is highly plastic but hardens very slowly, and the mold may be held at a temperature at which the composition hardens rapidly. Under such conditions the mold may be filled rapidly from the supply cylinder by injection of the composition under pressure. The composition may harden so rapidly at the temperature of the mold that the finished hardened piece may be removed almost immediately after the mold has been filled. Thus very rapid automatic operation of the machine is possible. The only difference between such an operation and the ordinary operation of injection molding a thermoplastic material is that in the injection molding of the present composition, the mold is at a higher temperature than the supply cylinder, whereas in injection molding of a thermoplastic material, the mold is at a lower temperature than the supply cylinder.

Thus a composition embodying the invention can be molded as economically as a thermoplastic material. The molding of other heat hardenable products is a much slower and more expensive operation than the molding of a thermoplastic material. When a composition embodying the invention is used in a molding or casting operation, plasticizers, lubricants, fillers, pigments and other coloring matter may be incorporated in the composition if desired.

Example 24

A polyester is prepared as hereinbefore described from one mol of fumaric acid or maleic anhydride and from 1.1 to 1.5 mols of diethylene glycol. Twenty parts of carbonyl bis-(allyl lactate) containing 4 parts of benzoyl peroxide are then added to 80 parts of the polyester with stirring. The composition is formed in a layer about 1½ inches wide, 2½ inches long and ⅛ inch thick between metal plates, and is held at a temperature of 70° C. for 16 hours. The resulting plate is harder than a plate prepared by a procedure that is the same except that styrene is used instead of carbonyl bis-(allyl lactate).

Example 25

To 80 parts of a polyester having an acid number of 22, prepared from equivalent quantities of maleic anhydride and diethylene glycol, are added 20 parts of tetra-(allyl glycolate) silicate containing 2 parts of benzoyl peroxide. The composition is cast in the form of a sheet and is held at 70° C. for 20 hours. The resulting sheet is hard, transparent and pale-straw colored, and shows no deterioration or decomposition when boiled in water for 1 hour. The boiled sheet is pliable but becomes hard again after drying out. The result is the same if the ratio of polyester to silicate is halved or if the amount of benzoyl peroxide is reduced by one-half.

Example 26

A polyester is prepared as hereinbefore described from equivalent quantities of fumaric acid or maleic anhydride and diethylene glycol or ethylene glycol. A solution of ½ part of benzoyl peroxide in 20 parts of carbonyl bis-(allyl lactate) is added to 80 parts of the polyester, and the resulting solution is mixed with 100 parts of powdered alpha cellulose by kneading in a heated Banbury mixer. The resulting molding composition, in spite of its high filler content, is a soft plastic material that is readily moldable at room temperature. It hardens in 5 to 15 seconds at 140–160° C. to a hard, tough, infusible product. The water resistance of the resulting hardened product is greater than the water resistance of a product obtained by a procedure that is the same except that the carbonyl bis-(allyl lactate) is omitted or is replaced by an equal weight of styrene.

Example 27

A polyester having an acid number of 10 is prepared by reacting 2 mols of ethylene glycol with 1 mol of fumaric acid and 1 mol of succinic anhydride in the manner hereinbefore described. If the resulting polyester is used in place of the polyester of Example 26 (the proportion of alpha cellulose being increased to 167 parts), the resulting molding composition produces molded articles that are somewhat softer and have less water resistance than articles prepared in accordance with the procedure of Example 26. A molding composition embodying the invention, as illustrated in these examples, hardens much faster and requires less catalyst than a composition in the preparation of which the carbonyl bis-(allyl lactate) has been omitted.

In the foregoing examples, the polyester may be replaced by any other polymerizable unsaturated polyester, the bis compound may be replaced by any of the other compounds hereinbefore described, and the proportion of such compound to the polyester may be varied if desired, to produce various embodiments of the invention. In general, the speed of hardening of the polymerizable polyester is increased by the incorporation of such a compound, and the speed of hardening of such a compound is increased by the incorporation of a polymerizable polyester.

Having described our invention, we claim:

1. A hardenable composition comprising four parts of a polymerizable unsaturated polyhydric alcohol-polycarboxylic acid polyester and one part of an ester of two unsubstituted beta-gamma-olefinic alcohol molecules, each having from three to four carbon atoms, with an ester of not more than two saturated alpha-hydroxy monocarboxylic acid molecules each having from two to three carbon atoms and a molecule of a benzene dicarboxylic acid.

2. A hardenable composition comprising four parts of a polymerizable unsaturated polyhydric alcohol-polycarboxylic acid polyester and one part of an ester of two unsubstituted beta-gamma-olefinic alcohol molecules, each having from three to four carbon atoms, with an ester of not more than two saturated alpha-hydroxy monocarboxylic acid molecules each having from two to three carbon atoms and a molecule of an unsubstituted dibasic acid having from one to five carbon atoms and having not more than a single olefinic unsaturation, in which there are not more than two connecting carbon atoms separating carboxy groups and not more than one carboxy group is attached to a single carbon atom.

3. A hardenable composition comprising four parts of a polymerizable unsaturated polyhydric alcohol-polycarboxylic acid polyester and one part of an ester of an unsubstituted dibasic acid having from one to four carbon atoms and having not more than a single olefinic unsaturation, in which not more than one carboxy group is attached to a single carbon atom, with an allyl ester of a saturated alpha-hydroxy monocarboxylic acid having from two to three carbon atoms.

4. A hardenable composition comprising four parts of a polymerizable unsaturated polyhydric alcohol-polycarboxylic acid polyester and one part of an ester of two unsubstituted beta-gamma-olefinic alcohol molecules, each having from three to four carbon atoms, with an ester of not more than two saturated alpha-hydroxy monocarboxylic acid molecules each having from two to three carbon atoms and a molecule of an unsubstituted saturated normal dibasic acid having from one to ten carbon atoms.

5. A hardenable composition comprising four parts of a polymerizable unsaturated polyhydric alcohol-polycarboxylic acid polyester, and one part of an ester of one molecule of carbonic acid with two molecules of an allyl ester of a saturated alpha-hydroxy monocarboxylic acid having from two to three carbon atoms.

6. The product of the polymerization of a hardenable composition claimed in claim 1.

7. The product of the polymerization of a hardenable composition claimed in claim 2.

8. The product of the polymerization of a hardenable composition claimed in claim 3.

9. The product of the polymerization of a hardenable composition claimed in claim 4.

10. The product of the polymerization of a hardenable composition claimed in claim 5.

11. A hardenable composition comprising four parts of a polymerizable unsaturated polyhydric alcohol-polycarboxylic acid polyester, and one part of a neutral ester of (1) an alcohol having the general formula: R—O—H, wherein R is of the class consisting of beta-chloro allyl and beta-methyl crotyl radicals and unsubstituted beta-gamma-olefinic radicals having from three to four carbon atoms, every R—O-radical in the neutral ester molecule being attached to a $>C=O$ group, with (2) an acid which is an ester of (a) at least one molecule of a hydroxy carboxylic acid of the class consisting of saturated alpha-hydroxy monocarboxylic acids having from two to three carbon atoms and hydroxy benzoic acids with (b) one molecule of a polybasic acid of the class consisting of silicic, malonic, benzene dicarboxylic, biphenyl dicarboxylic, napthalene dicarboxylic, cyclo hexane dicarboxylic, chloromaleic, bromomaleic, chlorofumaric, bromofumaric, unsubstituted saturated normal dibasic acids having from five to ten carbon atoms in the molecule, and unsubstituted dibasic acids having from one to five carbon atoms in the molecule and having not more than a single olefinic unsaturation, in which there are not more than two connecting carbon atoms separating carboxy groups and not more than one carboxy group is attached to a single carbon atom.

12. The product of the polymerization of a hardenable composition claimed in claim 11.

13. A hardenable composition comprising four parts of a polymerizable unsaturated polyhydric alcohol-polycarboxylic acid polyester and one part of an ester of four unsubstituted beta-gamma-olefinic alcohol molecules, each having from three to four carbon atoms, with an ester of four saturated alpha-hydroxy monocarboxylic acid molecules each having from two to three carbon atoms and a molecule of silicic acid.

14. The product of the polymerization of a hardenable composition claimed in claim 13.

ARTHUR M. HOWALD.
JOHN LESLIE JONES.

REFERENCES CITED

The following references are of record in the file of this patent:

UNITED STATES PATENTS

| Number | Name | Date |
| --- | --- | --- |
| 2,280,242 | Kropa et al. | Apr. 21, 1942 |
| 2,308,494 | D'Alelio | Jan. 19, 1943 |
| 2,319,798 | D'Alelio | May 25, 1943 |
| 2,323,706 | D'Alelio | July 6, 1943 |
| 2,370,565 | Muskat et al. | Feb. 27, 1945 |
| 2,370,566 | Muskat et al. | Feb. 27, 1945 |
| 2,370,574 | Muskat et al. | Feb. 27, 1945 |

FOREIGN PATENTS

| Number | Country | Date |
| --- | --- | --- |
| 540,168 | Great Britain | Oct. 8, 1941 |
| 540,169 | Great Britain | Oct. 8, 1941 |

Certificate of Correction

Patent No. 2,462,042 February 15, 1949

ARTHUR M. HOWALD ET AL.

It is hereby certified that errors appear in the printed specification of the above numbered patent requiring correction as follows:

Column 4, lines 66 to 68, for the formula column 5, lines 53 to 55, lower left-hand portion of the formula, for

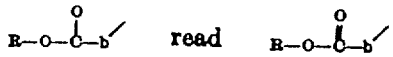

column 6, line 67, for "alchohol" read *alcohol*; column 10, line 37, for "citaroconic" read *citraconic*; column 11, line 55, for "stabilize" read *stabilizes*; column 15, line 26, for "ester to" read *ester of*; line 60, for "form" read *foam*; column 16, line 23, for "diisophopylene" read *diisopropylene*; column 18, line 31, after "lactate" insert a closing parenthesis; line 41, for the syllable and hyphen "hand-" read *hard-*; and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*